United States Patent [19]

Anderson et al.

[11] Patent Number: 4,822,659

[45] Date of Patent: Apr. 18, 1989

[54] FIRE BLOCK SHEET AND WRAPPER

[75] Inventors: James S. Anderson, Gurnee; Kenneth S. Hoffman, Deerfield; Jeffrey E. Julis, Buffalo Grove; Malinda Mercado, Des Plaines, all of Ill.

[73] Assignee: Bisco Products Inc., Park Ridge, Ill.

[21] Appl. No.: 103,064

[22] Filed: Sep. 30, 1987

[51] Int. Cl.[4] .......................... B32B 3/06; B32B 7/04; B32B 3/26
[52] U.S. Cl. ...................... 428/99; 428/100; 428/266; 428/268; 428/269; 428/305.5; 428/307.3; 428/317.9; 428/319.1; 428/319.3; 428/447; 428/921
[58] Field of Search ............ 428/99, 100, 307.3, 428/311.5, 317.9, 319.1, 319.3, 266, 268, 269, 305.5, 447, 921

[56] References Cited

U.S. PATENT DOCUMENTS

| | | | |
|---|---|---|---|
| 2,703,775 | 3/1955 | Panagrossi et al. | 428/307.3 |
| 4,189,545 | 2/1980 | Modic | 521/131 |
| 4,418,157 | 2/1983 | Modic | 521/82 |
| 4,476,188 | 10/1984 | Blizzard et al. | 428/447 |
| 4,695,597 | 9/1987 | Seino | 521/154 |

FOREIGN PATENT DOCUMENTS

| | | | |
|---|---|---|---|
| 0212829 | 11/1986 | European Pat. Off. | |
| 2295837 | 7/1976 | France | 428/319.1 |
| 869565 | 5/1961 | United Kingdom | 428/316.6 |
| 1215137 | 12/1970 | United Kingdom | 428/319.1 |

OTHER PUBLICATIONS

Bisco Products, Inc., Product Bulletin entitled "Biscote® Foamega® Brand Cellular Silicones Product Information" (Revised 7/1/84), one page.
General Electric Product Bulletin entitled "Silicone Product Data—RTF762 Silicone Rubber Foam", dated 11/85.
General Electric Product Description entitled "GE Silicones—RTF762 Fire Retardant Silicone Rubber Foam", dated 11/85, 2 pages.
Bisco Products Inc. Product Bulletin entitled "Bisco-te® Foamega® Brand Cellular Silicones Product Information", dated 1/3/87, 2 pages.
"Elastomerics"—March 1987, pp. 17-18, 20-22—"New Silicone Technologies for Flame Retardant Wire Constructions"—Donald L. Finney.
Plastics Compounding 1986/87 Redbook—pp. 26, 28-29.
Plastics Compounding, Jul./Aug. 1980—Solem Industries Reprint of "Alumina Trihydrate: Flame-Retarding, Smoke-Suppressing Filler", Joseph Z. Keating, 10 pages.
Modern Plastics, Sep. 1986, pp. 63-65.
Plastics Compounding 1987/1988 Redbook, pp. 68-70, 72.
Report of outside laboratory on Electrical Properties of Bisco Product described in Document BC.
Report of outside laboratory on Thermal Conductivity of Bisco Product described in Document BC.
Report of outside laboratory on Thermal Conductivity and Thermal Resistance of Bisco Product described in Document BC.
IEEE Transactions of Electrical Insulation, vol. EI-21, No. 2, Apr. 1986, pp. 175-182.

*Primary Examiner*—William J. Van Balen
*Attorney, Agent, or Firm*—Dressler, Goldsmith, Shore, Sutker & Milnamow, Ltd.

[57] ABSTRACT

A thermally insulative fire block sheet having an elastomeric layer is provided which has a surface flammability flame spread index of zero at 20 minutes of exposure in accordance with ASTM E-162 and which is capable, in a thickness of 1/16 inch, of blocking a flame of 1900° F. for more than an hour. The sheet comprises at least two layers. One layer, facing the direction of the expected flame, is a silicone foam rubber comprising the reaction product of a vinylterminated polysiloxane containing —Si(CH$_3$)$_2$O— units and an organohydrogensiloxane polymer containing Si(H)(CH$_3$)O— units. The silicone foam rubber also contains alumina trihydrate. The other layer is an adherent flame resistant support layer for said foam, preferably a glass cloth layer.

21 Claims, 1 Drawing Sheet

FIRE BLOCK SHEET AND WRAPPER

BACKGROUND OF THE INVENTION

There has been an ever increasing concern with limiting loss of life and damage to property from fires, both in connection with transportation and in stationary facilities.

In connection with rail transportation, for example, the Transportation Systems Center of the U.S. Department of Transportation developed proposed Guidelines for flame spread and smoke density, as measured by ASTM E-162 and E662, respectively, for all interior materials in fixed guideway vehicles. In the years since these standards were proposed, there has been improvement in the safety performance of such interior materials.

Two areas, however, were left without standards. There were no established standards to limit the amount of toxic off-gases and the standards permitted the acceptance of combustible materials which contributed significant fuel to fires. As a result, some products that conformed to the guidelines were nevertheless not totally satisfactory in a practical sense.

One material, which has been used for several years as a fire retardant material, is a silicone rubber foam that is a reaction product of a vinyl-terminated polysiloxane containing —Si(CH$_3$)$_2$O— units and an organohydrogen siloxane polymer containing —Si(H)(CH$_3$)O— units. This material has demonstrated good fire retardance and excellent weatherability, aging and durability properties and could be formulated to be a low emitter of toxic gases under fire conditions. Its fire retardance, however, is not good enough to meet the guidelines of the mass transit industry which require a flame spread index not greater than 25 when tested in accordance with ASTM E-162.

SUMMARY OF THE INVENTION

In accordance with the present invention, a thermally insulative fire block sheet having an elastomeric layer is provided which has a surface flammability flame spread index of zero at 20 minutes of exposure in accordance with ASTM E-162 and which is capable, in a thickness of 1/16 inch, of blocking a flame of 1900° F. for more than an hour. The sheet comprises at least two layers. One layer, facing the direction of the expected flame, is a cured silicone foam rubber comprising the reaction product of a vinyl-terminated polysiloxane containing —Si(CH$_3$)$_2$O— units and an organohydrogen siloxane polymer containing —Si(H)CH$_3$)O— units. The silicone rubber foam also contains alumina trihydrate.

The other layer is an attached, adherent flame resistant support layer for the silicone foam, and is preferably a glass cloth layer.

A glass cloth fabric that has been found to be useful is a plain weave fiberglass fabric with a mass of about 200 grams per square meter and a thickness of about 0.17 millimeters that is fabricated from lubricated continuous yarn filaments which are each composed of electrical grade glass having a filament diameter of about 0.009 millimeters and which are combined in a single strand as one ply having a strand weight of about 66 grams per 1000 meters.

The silicone rubber foam is a modification of the foam sold commercially by General Electric Company as RTF 762 Silicone Rubber Foam. The latter is described in Modic U.S. Pat. No. 4,418,157; granted Nov. 29, 1983; and further details are described in Modic U.S. Pat. No. 4,189,545, granted Feb. 19, 1980. The commercially available silicone rubber foam is made of two ingredients, labelled "A" and "B", as hereinafter described. The silicone rubber foam of this invention contains, as an additional ingredient, from about 30 to about 55 weight percent of alumina trihydrate.

Part A of the silicone rubber formulation contains a polymer having the formula:

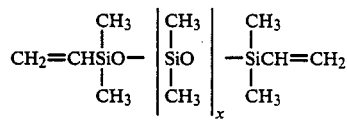

Part A also contains a finely divided crystalline silica in an amount from about 10 to about 100 parts by weight based on 100 parts of vinyl-containing polysiloxane and preferably 20 to 25 parts by weight thereof.

In addition, as disclosed in U.S. Pat. No. 4,189,545, Part A contains from 1 to 250 parts per million of a platinum catalyst, preferably a complex of platinum and a vinyl-containing polysiloxane.

Part B of the silicone rubber formulation contains a polymer having the formula:

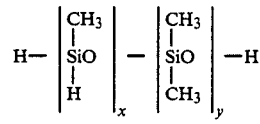

In accordance with this invention, alumina trihydrate is added to the silicone rubber, generally to Part A thereof before the blending thereof with Part. B. The preferred blending ratios for Parts A and B is from about 10 to about 16 parts by weight of Part B per 100 parts of Part A. The preferred blending ratio between Part A and the alumina trihydrate is from about 50 to 125 parts of alumina trihydrate per 100 parts of Part A.

When silicone foams are prepared at varying ratios (in parts by weight) of Parts A and B and the alumina trihydrate, the following results are obtained:

| Part A | 100 | 100 | 100 | 100 | 100 | 100 |
|---|---|---|---|---|---|---|
| Alumina trihydrate | 0 | 50 | 75 | 100 | 125 | 150 or greater |
| Part B | 7 | 11 | 12.5 | 14 | 16 | 18 or greater |
| Pass/Fail flame tests | Fail | Pass | Pass | Pass | Pass | Cannot be mixed |

The alumina trihydrate generally contains about 65 weight percent of Al$_2$O$_3$ and about 35 weight percent of bound water which is lost on ignition. Good results have been obtained with alumina trihydrate materials which have the following properties:

| | |
|---|---|
| Al$_2$O$_3$, % | 64.4–65.4 |
| SiO$_2$, % | less than 0.02 |
| Fe$_2$O$_3$, % | 0.004–0.007 |
| Na$_2$O total, % | 0.015–0.30 |
| Na$_2$O soluble, % | 0.004–0.12 |
| Free moisture, 110° C., % | 0.05–0.12 |
| Loose bulk density, gm/cu cm | 0.35–1.2 |
| Packed bulk density, gm/cu cm | 0.5–1.5 |
| Surface area, sq m/gm | 0.10–14 |

| -continued | |
|---|---|
| Color reflectance | 75 to 96 | wherein the surface area is measured by Perkins-Elmer Shell Sorptometer, and wherein the light reflectance is measured with a photo-volt reflectometer Model 670.

While it is not desired to be bound by any theory of operation, it is believed that the alumina trihydrate component functions initially by absorbing heat, first from the decomposition of the hydrate to liberate water and by vaporization of the water. Thereafter, after removal of the water, it is believed that the alumina combines with the silicone to produce aluminosilicate ceramics having substantial heat resistance.

After exposure to high temperatures, the normally flexible and resilient silicone foam rubber becomes brittle and crumbly and would fall apart if the silicone rubber layer were not adhered to the support layer.

The support layer may be any cohesive layer of a heat resistant material, such as a fiberglass cloth, and particularly a plain weave fiberglass cloth having a mass of 6 ounces per square yard and a thickness of 0.0068 inches. The support layer may also be made of other heat resistant fibers, such as wool, aramid, or polybenzimidazole, or of blends of such fibers with each other or with glass fibers.

The support layer may also be rigid, rather than flexible for certain uses, and may thus comprise materials such as plywood or composition board.

The support layer may also be a continuous, flexible impervious flame resistant sheet, such as a sheet of aluminum foil.

The bonding between the silicone foam rubber layer and the support layer is believed to be essentially mechanical with the silicone foam rubber layer penetrating slightly into the interstices in the glass fabric, for example. When the supporting layer is smooth, it may be necessary in some cases to use an adhesive, such as an acrylic adhesive, to bond the silicone foam rubber to the supporting layer. However, with aluminum foil an adhesive is unnecessary.

BRIEF DESCRIPTION OF THE DRAWINGS

The invention may be better understood by reference to the drawings in which.

DETAILED DESCRIPTION OF THE INVENTION

Figure 1:
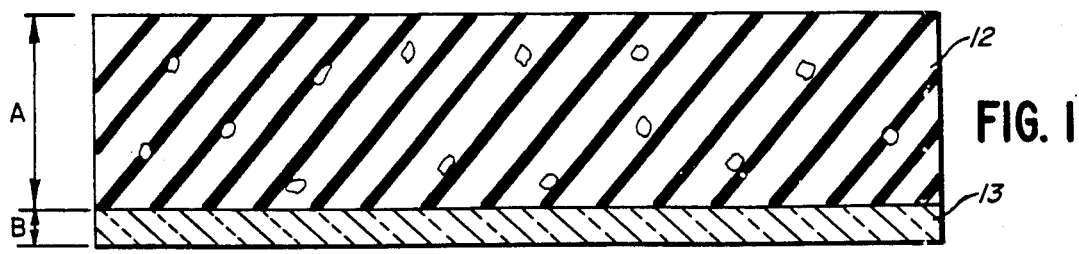
FIG. 1 is a cross-sectional view of one embodiment of the fire block sheet of the invention.

As shown in FIG. 1, the fire block sheet of this invention, in its simplest form, comprises a silicone foam rubber layer 12, having a thickness dimension "A", attached to a support layer 13, such as a layer of fiberglass cloth, having a thickness "B".

Dimension "A" is typically substantially greater than dimension "B", although dimension "B" may be greater for certain contemplated uses. For sale on continuous rolls, the entire thickness of the fire block sheet (A+B) is typically from about 1/16 to about ¼ inch.

Figure 2:
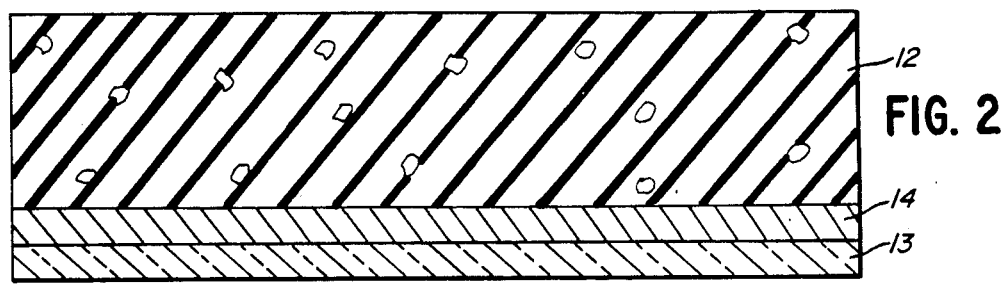
FIG. 2 is a cross-sectional view of another embodiment of the fire block sheet of the invention.

In the embodiment of FIG. 2, there is an intermediate layer 14, of a metallic foil such as aluminum foil, between layers 12 and 13, which have the same meanings as in FIG. 1. In this embodiment, the aluminum foil, being impervious and reflective, prevents heat transfer therethrough by convection and reflects much of the heat which could otherwise pass therethrough by radiation. In addition, it transfers heat laterally by conduction. The latter property is applicable for uses where the expected source of heat would be a point source, such as a cigarette, match or welding torch.

Figure 3:
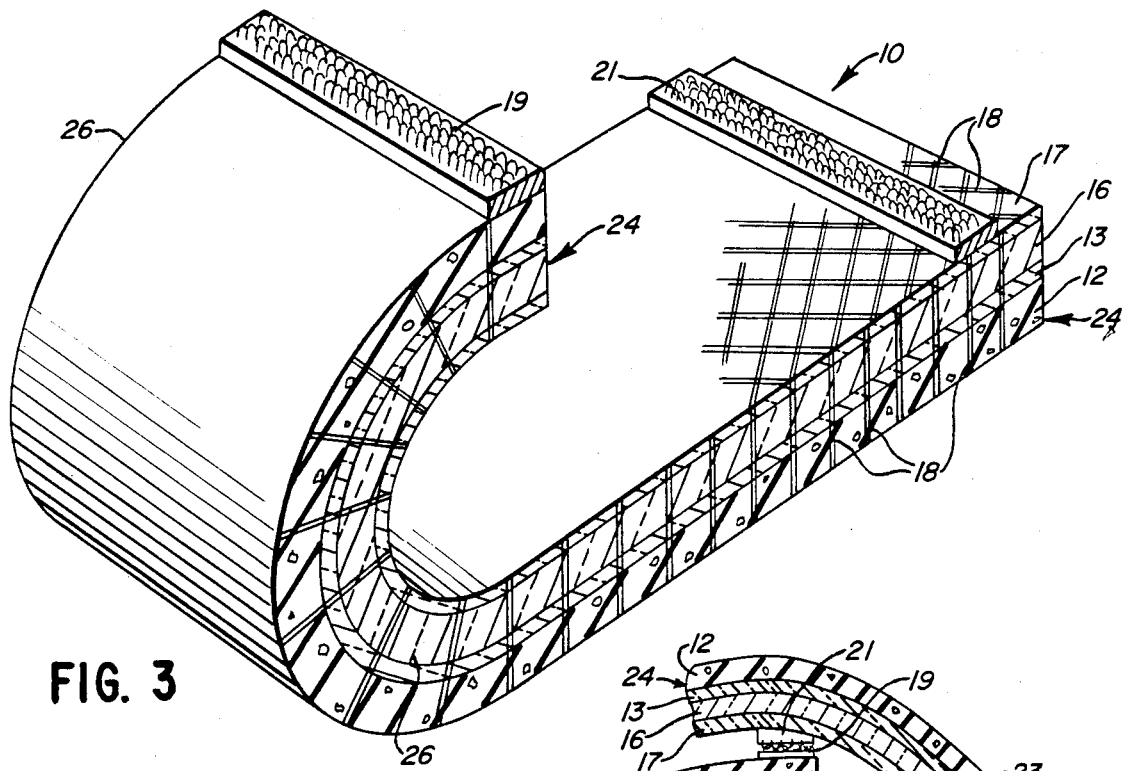
FIG. 3 is a perspective of another embodiment of the invention designed for the protection of electrical conducting cables.

The embodiment of FIG. 3 is designed for the protection of electrical conducting cables. In an industrial plant, and particularly in a nuclear power plant, it may be necessary during a fire, or other overheating, to transmit electrical energy to sense the emergency or its location, or to transmit power to equipment designed to cope with the emergency. Damage to electrical cables during a fire could frustrate the operation of damage control precisely when it is most needed.

In the rectangular fire block wrapper 10 shown in FIG. 3, layers 12 and 13 represent silicone foam rubber and fiberglass cloth as in FIG. 1. Layer 16 is a thick layer of non-woven insulating material, such as glass wool, and layer 17 is another layer of fiberglass cloth. The layers are stitched together in a quilting pattern (partially shown on the surface of layer 12) by ceramic stitching 18. Wrapper 10 includes end margins 24 and side margins 26.

Attachment strips 19 and 21, together comprise a fastening means made up of flexible strips of synthetic material, hook and loop type filament faced fasteners of the type generally known by the trademark VEL-CRO ®, strip 19 being secured at one side surface of wrapper 10 at one end margin and strip 21 being secured at the opposite side surface of wrapper 10 at the other end margin.

Figure 4:
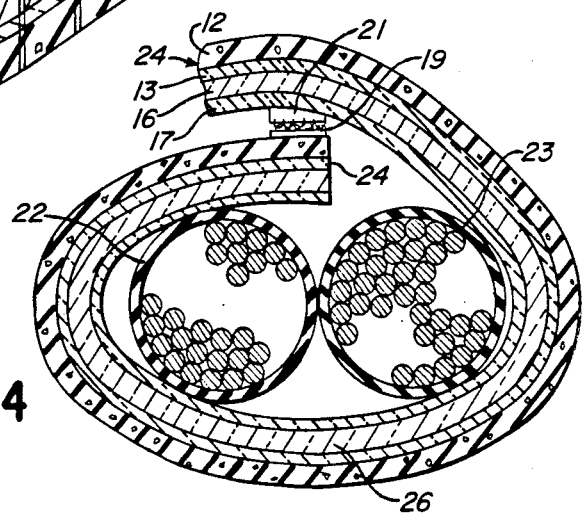
FIG. 4 is a reduced scale cross-sectional view of electrical conducting cables wrapped in the embodiment of FIG. 3.

FIG. 4 shows the application of the wrapping product of FIG. 3 as it is wrapped around two electrical conducting cables 22 and 23 while attachment strips 19 and 21 are attached to each other to produce a closure about the cables. Elements in FIG. 4 which are identical to those of FIG. 3 bear the same identification numerals.

The fire block sheet of this invention may be made by first mixing the A portion of the silicone foam [comprising a vinyl-terminated polysiloxane containing —Si(CH$_3$)$_2$O— units] with an approximately equal weight of finely divided alumina trihydrate with a paddle or in a dough mixer. Mixing generally takes 5–7 minutes and is continued until uniformity is obtained.

Then, the B portion of the silicone foam (comprising an organohydrogen siloxane polymer containing —Si(H)(CH$_3$)O— units) is added to the mixture in an amount of about 14 parts by weight per 100 parts of the original A portion. The components are vigororously mixed for about 30–45 seconds until uniformity is obtained.

Meanwhile, a process assembly has been prepared by attaching two sheets of matte polyester film (e.g., the film sold under the trademark Mylar ®), to each other along one edge to form a hinged construction. The assembly is placed horizontally opened at its hinge, and a sheet of fiberglass cloth is placed on one of the polyester sheets.

The above-described mixture is then immediately poured onto the fiberglass cloth on the lower of the two sheets of matte polyester film; and the upper sheet is then closed over the mixture and the sheets positioned horizontally with the upper sheet parallel to the lower sheet. A roller is passed over the outer surface of the upper polyester sheet to spread the mixture through the entire area between the polyester sheets and to compress the mixture to a desired thickness.

The material between the two polyester sheets is cured at room temperature for about 15-20 minutes and then in a 100° F. oven for about 5 minutes. A foam is formed in the desired thickness which is laminated to the fiberglass cloth.

The two polyester sheets are then peeled off the opposite surfaces of the fiberglass/silicone foam laminate.

The silicone foam layer of the product is a soft, flexible, partially closed cell foam which generally has a density between about 27 and about 37 pounds per cubic foot.

Typical properties of the fire block sheet are as follows:

| Property | Value | Test |
|---|---|---|
| Flammability Properties | | |
| Surface flammability (20 min.) | | ASTM E-162 |
| flame spread index | 0 | |
| Optical density of smoke (smoldering or burning) | | ASTM E-662 |
| 90 seconds | 3 | |
| 4 minutes | 18 | |
| Maximum (20 min.) | 68 | |
| Toxic gas generation (Flaming Mode) | | Boeing BSS 7239 |
| CO (Max) | 362 ppm | |
| HCl | 19 ppm | |
| $SO_2$ | 4 ppm | |
| HF, HBr, $COCl_2$, $NO_x$ | less than 2 ppm | |
| Horizontal burn through @ 1800° F. | more than 4 hours | |
| Flame Resistance (UL) | 94VO | UL-94 |
| Flame & Glow | less than 1 sec. (self extinguishing) | |
| Char length | 0 | |
| Thermal Properties | | |
| Thermal Conductivity (100° F.) | Approx. 0.630 BTU in./hr./ft²/°F. | ASTM C-177 (⅛" thick) |
| Thermal Resistance | Approx. 0.210 hrs. ft² °F. BTU | ASTM C-177 (⅛" thick) |
| Electrical Properties | | |
| Dielectric Strength | 68 volts/mil. min. | ASTM D-149 |
| Volume Resistivity | $4.4 \times 10^{15}$ ohms/cm | ASTM D-247 (⅛" thick) |
| Power factor @ 100 HZ | 0.054 | ASTM D-150 (⅛" thick) |
| Dielectric Constant @ 100 HZ | 1.90 | ASTM D-150 (⅛" thick) |

All of the foregoing tests were run on 1/16" fire block sheets of FIG. 1 except where otherwise specified.

The fire block sheets of this invention may be useful in the fabrication of seats and other furnishings in aircraft and in passenger railroad cars. They may also be useful in the manufacture of switch box shields, in the jacketing of power, signal and communication cables, in rail car underbody flooring, in power rail coverings and as fire barriers in busses in the rear above the rear axle and in front of the engine compartment.

The invention has been described with reference to its preferred embodiments. It will be understood, however, by those skilled in the art that modifications may be employed without departing from the scope of the invention as defined in the claims.

We claim:

1. A thermally insulative fire block sheet having an elastomeric layer, said sheet having a surface flammability flame spread index of zero at 20 minutes of exposure in accordance with ASTM E-162 and which is capable, in a thickness of 1/16 inch, of blocking a flame of 1900° F. for more than one hour, said sheet comprising a flexible laminate of (a) a support layer and (b) an elastomeric cured silicone foam rubber containing alumina trihydrate layer attached to said support layer.

2. The fire block sheet of claim 1 wherein said support layer is a fiberglass woven fabric.

3. The fire block sheet of claim 1 wherein said silicone foam rubber layer comprises the reaction product of a vinyl-terminated polysiloxane containing $-Si(CH_3)_2O-$ units and an organohydrogen siloxane polymer containing $-Si(H)(CH_3)O-$ units.

4. The fire block sheet of claim 1 wherein said cured silicone foam rubber layer comprises the reaction product of a vinyl-terminated polysiloxane containing $-Si(CH_3)_2O-$ units and an organohydrogen siloxane containing $-Si(H)(CH_3)O-$.

5. The fire block sheet of claim 4 wherein said reaction product is made from about 10 to 16 parts by weight of said organohydrogensiloxane for each 100 parts of said vinyl-terminated polysiloxane.

6. The fire block sheet of claim 4 wherein said reaction product contains from about 50 to about 125 parts by weight of alumina trihydrate per 100 parts of said vinyl-terminated polysiloxane.

7. The fire block sheet of claim 6 wherein said reaction product contains finely divided silica.

8. The fire block sheet of claim 6 wherein said reaction product contains from 1 to 250 parts of a platinum catalyst per million parts of said vinyl-terminated polysiloxane.

9. The fire block sheet of claim 2 wherein said cured silicone foam rubber layer and said fiberglass woven fabric layer are directly attached to each other.

10. The fire block sheet of claim 2 wherein said cured silicone foam rubber layer and said fiberglass woven fabric layer are attached to each other through an intermediate layer of aluminum foil.

11. The fire block sheet of claim 1 wherein said alumina trihydrate has the following properties:

| | |
|---|---|
| $Al_2O_3$, % | 64.4-65.4 |
| $SiO_2$, % | less than 0.02 |
| $Fe_2O_3$, % | 0.004-0.007 |
| $Na_2O$ total, % | 0.015-0.30 |
| $Na_2O$ soluble, % | 0.004-0.12 |
| Free moisture, 110° C., % | 0.05-0.12 |
| Loose bulk density, gm/cu cm | 0.35-1.2 |
| Packed bulk density, gm/cu cm | 0.5-1.5 |
| Surface area, sq m/gm | 0.10-14 |
| Color reflectance | 75 to 96 | wherein the surface area is measured by Perkins-Elmer Shell Sorptometer, and wherein the light reflectance is measured with a photo-volt reflectometer Model 670.

12. The fire block sheet of claim 1 wherein said cured silicone foam rubber layer is a partially closed cell foam.

13. The fire block sheet of claim 1 wherein said cured silicone foam rubber layer has a density ranging between about 27 and about 37 pounds per cubic foot.

14. The fire block sheet of claim 6 wherein said silicone foam rubber layer contains from about 10 to 100 parts of crystalline silica per 100 parts of said vinyl-terminated polysiloxane.

15. A fire block wrapper for electrical conducting cables comprising a thermally insulative fire block sheet including an elastomeric layer, said sheet having a surface flammability flame spread index of zero at 20 minutes of exposure in accordance with ASTM E-162 and which is capable, in a thickness of 1/16 inch, of blocking a flame of 1900° F. for more than one hour, said sheet having a rectangular configuration with two side margins and two end margins;

said fire block sheet comprising a flexible laminate of a support layer and said elastomeric layer, said elastomeric layer comprising a cured silicone foam rubber layer containing alumina trihydrate and being secured to one side surface of said support layer;

said fire block wrapper further including a layer of thermal insulation material adjacent the other side surface of said support layer;

fastening means secured to said wrapper and provided at one end margin on one surface of said laminate and at the other end margin on the opposite surface of said laminate; and said silicone foam rubber layer, said support layer, and said insulation material layer being flexible, whereby said wrapper can be wrapped around a conduit or the like and secured in place with said fastening means.

16. The fire block wrapper of claim 15, and wherein said support layer is a woven fiberglass fabric.

17. The fire block wrapper of claim 15, and wherein said wrapper further includes a fabric backing sheet disposed adjacent a side surface of said insulation layer.

18. The fire block wrapper in accordance with claim 17 in which said fastening means includes flexible strips of synthetic material hook and loop type filament faced fasteners secured to said wrapper.

19. The fire block wrapper of claim 18 and wherein said fastening means are secured by stitching through said silicone foam rubber layer, support layer, insulation material layer, and said backing sheet along said end margins.

20. The fire block wrapper of claim 17, and wherein the layers of said wrapper are secured to each other by stitching.

21. A thermally insulative fire block sheet having an elastomeric layer, said sheet having a surface flammability flame spread index of zero at 20 minutes of exposure in accordance with ASTM E-162 and which is capable, in a thickness of 1/16 inch, of blocking a flame of 1900° F. for more than one hour, said fire block sheet comprising a flexible laminate of (a) a support layer compromising woven fiberglass and (b) an elastomeric cured silicone foam rubber comprising a reaction product of a vinyl-terminated polysiloxane containing —Si(CH$_3$)$_2$O— units and from 10 to 16 parts by weight of an organo-hydrogen siloxane containing —Si(H)(CH$_3$)O— units per 100 parts of said vinyl-terminated polysiloxane, said silicone rubber containing about 50 to about 125 parts by weight of alumina trihydrate per 100 parts of said vinyl-terminated polysiloxane and having a density from about 27 to about 37 pounds per cubic foot.

* * * * *

UNITED STATES PATENT AND TRADEMARK OFFICE
CERTIFICATE OF CORRECTION

PATENT NO. : 4,822,659

DATED : April 18, 1989

INVENTOR(S) : James S. Anderson, Kenneth A. Hoffman, Jeffrey E. Julis and Malinda Mercado It is certified that error appears in the above-identified patent and that said Letters Patent is hereby corrected as shown below:

Cover page at item [75], "Kenneth S. Hoffman"

should be --Kenneth A. Hoffman--.

Signed and Sealed this

Twenty-seventh Day of February, 1990

Attest:

JEFFREY M. SAMUELS

Attesting Officer     Acting Commissioner of Patents and Trademarks